US012600630B1

(12) United States Patent
Salhi et al.

(10) Patent No.: US 12,600,630 B1
(45) Date of Patent: Apr. 14, 2026

(54) METHOD OF SYNTHESIZING CARBON QUANTUM DOTS

(71) Applicant: King Fahd University of Petroleum and Minerals, Dhahran (SA)

(72) Inventors: Billel Salhi, Dhahran (SA); Mazen Khaled Nazal, Dhahran (SA); Amir Al-Ahmed, Dhahran (SA); Ismail Abdulazeez, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/359,296

(22) Filed: Oct. 15, 2025

(51) Int. Cl.
| | |
|---|---|
| *C01B 32/15* | (2017.01) |
| *B01D 61/24* | (2006.01) |
| *B01D 69/02* | (2006.01) |
| *B82Y 20/00* | (2011.01) |
| *B82Y 40/00* | (2011.01) |
| *C09K 11/65* | (2006.01) |

(52) U.S. Cl.
CPC ............ *C01B 32/15* (2017.08); *B01D 61/243* (2013.01); *B01D 69/02* (2013.01); *C09K 11/65* (2013.01); *B01D 2325/02834* (2022.08); *B82Y 20/00* (2013.01); *B82Y 40/00* (2013.01); *C01P 2002/84* (2013.01); *C01P 2004/04* (2013.01); *C01P 2004/32* (2013.01); *C01P 2004/64* (2013.01); *C01P 2006/60* (2013.01)

(58) Field of Classification Search
None
See application file for complete search history.

(56) References Cited

U.S. PATENT DOCUMENTS

| | | | | |
|---|---|---|---|---|
| 12,116,515 B1* | 10/2024 | Khan | ...................... | C01B 32/15 |
| 12,187,936 B1* | 1/2025 | Khan | ...................... | C01B 32/15 |
| 12,187,937 B1* | 1/2025 | Khan | ...................... | C01B 32/15 |
| 12,187,938 B1* | 1/2025 | Khan | ...................... | C09K 11/65 |
| 2008/0268246 A1* | 10/2008 | Stark | ...................... | B82Y 30/00 |
| | | | | 75/363 |
| 2021/0060498 A1* | 3/2021 | Gai | ...................... | B01D 69/02 |
| 2021/0206642 A1* | 7/2021 | Tour | ...................... | C01B 32/184 |
| 2022/0104499 A1* | 4/2022 | Wang | ...................... | C01B 33/021 |

FOREIGN PATENT DOCUMENTS

| | | | | |
|---|---|---|---|---|
| CN | 106477553 A | 3/2017 | | |
| CN | 106892419 A | 6/2017 | | |
| CN | 106629659 B | 11/2018 | | |
| CN | 111621292 A | 9/2020 | | |
| CN | 112410025 A | * | 2/2021 | ......... A61K 49/0067 |

OTHER PUBLICATIONS

Pie et al.; Derwent Abstract of CN 113321231-A to Pie et al., "Preparing Calcite by Induction of Herbaceous Plant and Carbon Quantum Dot Solution with Soluble Calcium Salt Solution"; Aug. 31, 2021.*
Fernando G. Torres, et al., "Carbon Quantum Dots Based on Marine Polysaccharides: Types, Synthesis, and Applications", Marine Drugs 2023, vol. 21, Issue 6, 338, May 31, 2023, 30 pages.

* cited by examiner

*Primary Examiner* — John J Figueroa
(74) *Attorney, Agent, or Firm* — Oblon, McClelland, Maier & Neustadt, L.L.P.

(57) ABSTRACT

A method of synthesizing carbon quantum dots (CQDs) includes using a dried ground *Halodule uninervis* seagrass to form a suspension in water, followed by centrifuging and filtering through a filter membrane and a dialysis membrane to form a CQDs solution. The CQDs have a Stokes shift of less than 83.0 nm at an excitation wavelength of 380 to 430 nm.

15 Claims, 8 Drawing Sheets

| 700 nm | 610 nm | 580 nm | 530 nm | 490 nm | 460 nm | 400 nm |
| Red | Orange | Yellow | Green | Cyan | Blue | Violet |

METHOD OF SYNTHESIZING CARBON QUANTUM DOTS

CROSS-REFERENCE TO RELATED APPLICATION

The present disclosure claims the benefit of Saudi Patent Application No. 1020257602 filed on Oct. 14, 2025 with the Saudi Authority for Intellectual Property Office, which is incorporated herein by reference in its entirety.

BACKGROUND

Technical Field

The present disclosure is directed to a method of synthesizing carbon quantum dots (CQDs). More particularly, the present disclosure is directed to a method of synthesizing CQDs from *Halodule uninervis* seagrass powder using green solvents.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Carbon quantum dots (CQDs) are a new class of carbon-based nanomaterials with sizes typically less than 10 nm, known for their unique optical and electronic properties such as strong fluorescence, high stability, biocompatibility, and low toxicity. These features make them highly promising for applications in bioimaging, sensing, catalysis, and energy storage. Generally, CQDs are synthesized by two broad approaches including top-down and bottom-up methods. The top-down method involves breaking bulk carbon sources into nanosized particles using techniques like arc discharge, laser ablation, or electrochemical oxidation, whereas bottom-up method relies on assembling nanoscale carbon structures from molecular precursors through processes such as hydrothermal treatment, microwave synthesis, or thermal decomposition. However, these conventional methods often suffer from drawbacks including harsh reaction conditions, high energy consumption, use of toxic reagents, and limited control over particle size and surface functionalities.

To overcome these issues, biomass-derived CQDs have attracted considerable attention as they utilize renewable and eco-friendly sources such as fruit peels, leaves, cellulose, and other natural wastes. These materials are abundant, low-cost, and inherently rich in carbon and heteroatoms, making them suitable for green synthesis through hydrothermal or pyrolytic processes. Additionally, biomass-derived CQDs often possess diverse surface functional groups, which enhance their chemical activity and fluorescence properties. Despite these advantages, biomass-based CQDs also face challenges such as inconsistent quality due to variability in natural precursors, difficulty in controlling size distribution, impurities affecting reproducibility, and limitations in scalability. Therefore, alternative synthesis strategies, such as heteroatom doping, surface passivation, and controlled chemical routes, are increasingly being explored to achieve uniform, high-performance CQDs with tunable properties suitable for advanced applications.

Accordingly, one object of the present disclosure is to provide fluorescent CQDs from sustainable and low-cost natural precursors. In the present disclosure, CQDs were synthesized from a grass through a simple hydrothermal method, offering an eco-friendly approach that utilizes abundant biomass resources.

SUMMARY

In an exemplary embodiment, a method of synthesizing carbon quantum dots (CQDs) is described. The method includes grinding a dry *Halodule uninervis* seagrass to form a seagrass powder and heating a mixture including water and the seagrass powder to form a suspension. The method further includes centrifuging the suspension to obtain a supernatant and filtering the supernatant through a filter membrane and a dialysis membrane to form a CQDs solution including a plurality of CQDs. The CQDs have a Stokes shift of less than 83.0 nm at an excitation wavelength of 380 to 430 nm.

In some embodiments, the *Halodule uninervis* seagrass is obtained from a Red Sea and washed to remove water-soluble impurities from the sea.

In some embodiments, the mixture includes the seagrass powder at a percentage of 1 to 10 wt./vol. % based on a total weight of the seagrass powder and a total volume of the water.

In some embodiments, the heating is performed in an autoclave at a temperature of 150 to 250 degrees Celsius (° C.).

In some embodiments, the centrifuging is performed under at least 12,000 rpm.

In some embodiments, the filtration membrane comprises a plurality of pores having an average size of 0.2 to 0.3 micrometers ($\mu$m).

In some embodiments, the CQDs have a photoluminescence signal at 390 to 410 nm wavelength range at an excitation wavelength of 350 to 450 nm.

In some embodiments, the CQDs have a light absorption including a first peak, a second peak, and a third peak.

In some embodiments, the first peak is at 200 to 250 nm.

In some embodiments, the second peak is at 250 to 300 nm.

In some embodiments, the third peak is at 300 to 350 nm.

In some embodiments, the CQDs have an optical band gap energy of 3 to 4 eV.

In some embodiments, the CQDs are in the form of spherical particles having a size of 4 to 11 nm.

In some embodiments, the CQDs have a stokes shift of 80 to 82 nm at an excitation wavelength of 380 to 430 nm and an emission wavelength of 460 to 490 nm.

In some embodiments, the CQDs have a stokes shift of 80 to 83 nm at an excitation wavelength of 420 to 430 nm and an emission wavelength of 500 to 510 nm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
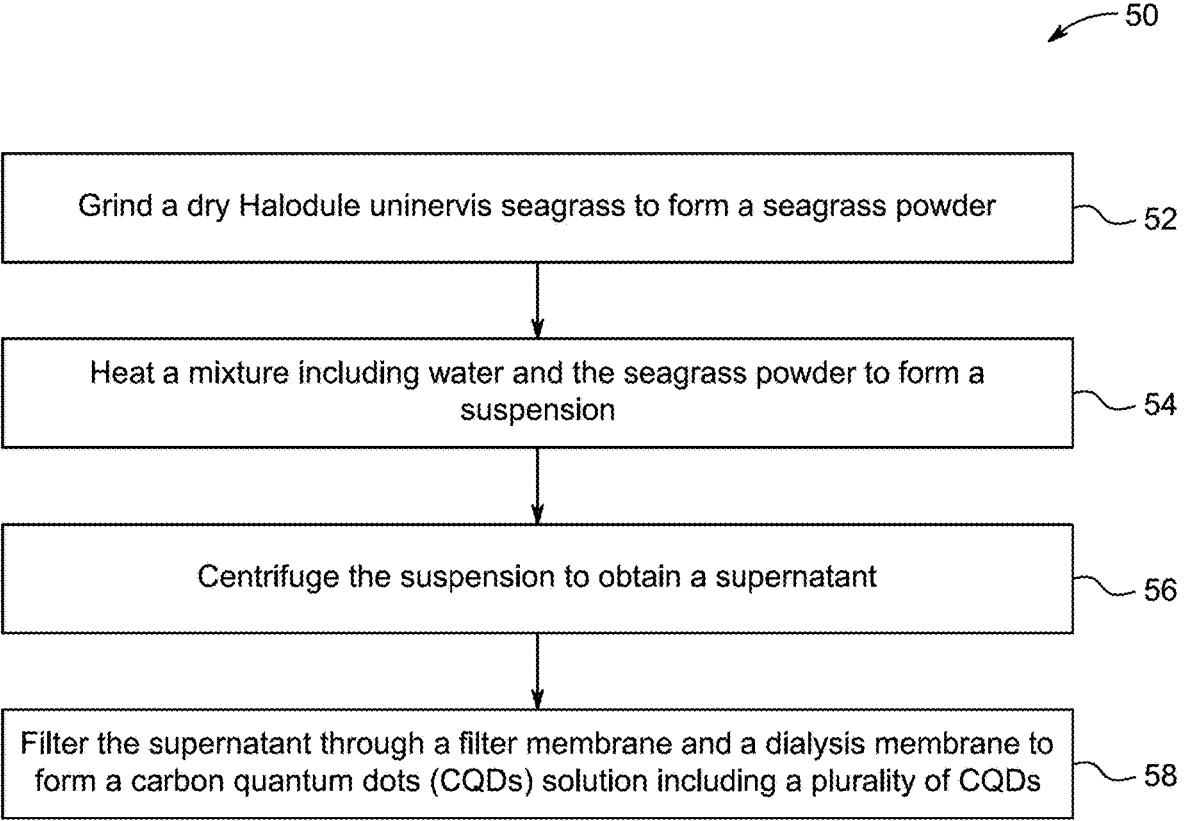
FIG. 1 is an exemplary flowchart illustrating a method of synthesizing carbon quantum dots (CQDs), according to certain embodiments.

Embodiments of the present invention may now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term 'room temperature' refers to a temperature range of '25 degrees Celsius (° C.)±3° C.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), volume percent (vol. %) or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'carbon quantum dots' refers to a nanosized carbon-based particles, typically less than 10 nm in diameter, that exhibits unique optical, electrical, and chemical properties. These dots generally contain an amorphous or crystalline carbon core with various functional groups on the surface, which contribute to their high water dispersibility, tunable photoluminescence (PL), chemical stability, and biocompatibility.

As used herein, the term 'hydrothermal treatment' refers to a synthesis or processing method in which materials are subjected to elevated temperature and pressure in a sealed aqueous environment, typically within an autoclave. This process facilitates crystallization, particle growth, or chemical transformation by enhancing the solubility and reactivity of precursors in water.

As used herein, the term 'optical band gap energy' refers to the minimum energy required to excite an electron from the valence band to the conduction band of a material as determined from its optical absorption spectrum. It represents the threshold energy at which a material begins to absorb photons and exhibits electronic transitions, often measured using techniques such as UV-visible spectroscopy and analyzed through methods like Tauc plots.

As used herein, the term 'Stokes shift' refers to the difference in energy or wavelength between the position of the absorption maximum and the emission maximum of a fluorophore or luminescent material.

Aspects of the present disclosure are directed to the synthesis of fluorescent carbon quantum dots (CQDs) from waste *Halodule uninervis* seagrass via a green route. The CQDs showed strong photoluminescence and good stability, highlighting their potential for sensing applications.

According to a first aspect of the present disclosure, a method of synthesizing CQDs is described. FIG. 1 illustrates a schematic flow chart of a method 50 for synthesizing the CQDs. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes grinding a dry *Halodule uninervis* seagrass to form a seagrass powder. In some embodiments, the CQDs can be synthesized from a wide range of biomass and natural waste materials, including fruit and vegetable peels, rice husk, sugarcane bagasse, tea leaves, coffee grounds, and other agricultural residues. In a preferred embodiment, the CQDs are synthesized from a *Halodule uninervis* seagrass where the *Halodule uninervis* seagrass is obtained from water collected from a Red Sea, and the *Halodule uninervis* seagrass is further washed to remove water-soluble impurities from the sea. In some embodiments, the water-soluble impurities may include sodium chloride, magnesium and calcium salts, sulfates, and other inorganic ions abundant in seawater. In addition, dissolved organic matter such as polysaccharides, proteins, amino acids, and tannins may be present, along with nutrients like nitrates and phosphates, and traces of metal ions.

The *Halodule uninervis* seagrass is further dried and then grinded into a powder. In some embodiments, the *Halodule uninervis* seagrass is dried by methods including sun drying, oven drying, hot air drying and microwave drying and further the grinding of the *Halodule uninervis* seagrass in form of fine powder can be done by methods including manual grinding with mortar and pestle, mechanical grinding using a blender or grinder, ball milling, cryogenic grinding, and planetary milling.

At step 54, the method 50 includes heating a mixture including water and the seagrass powder to form a suspension. In some embodiments, the mixture is heated by methods including conventional oven heating, hot plate heating (with or without stirring), oil bath heating, water bath heating, sand bath heating, mantle heating, microwave heating, infrared heating, autoclave/solvothermal heating, or induction heating, optionally under controlled temperature, pressure, or atmosphere.

In some embodiments, the mixture includes the seagrass powder at a percentage of 1-10 wt./vol. %, preferably 2-9 wt./vol. %, preferably 2.5-8.5 wt./vol. %, preferably 3-8 wt./vol. %, preferably 3.5-7.5 wt./vol. %, preferably 4-6.5 wt./vol. %, preferably 4.5-6 wt./vol. % and preferably 5-5.5 wt./vol. % based on a total weight of the seagrass powder and a total volume of the deionized water. In other embodiments, the mixture includes the seagrass powder at a percentage of 1-3 wt./vol. %, preferably 1.2-2.9 wt./vol. %, preferably 1.3-2.8 wt./vol. %, preferably 1.4-2.7 wt./vol. %, preferably 1.5-2.6 wt./vol. %, preferably 1.6-2.5 wt./vol. %, preferably 1.7-2.4 wt./vol. %, preferably 1.8-2.3 wt./vol. % and preferably 1.9-2.2 wt./vol. % based on a total weight of the seagrass powder and a total volume of the deionized water. The water may include, but is not limited to, tap water, distilled water, bi-distilled water, deionized water, deionized distilled water, reverse osmosis water, and/or some other water. In a preferred embodiment, the mixture includes approximately 2 wt./vol. % of the seagrass powder based on the total volume of the water.

In some embodiments, the mixture including water and seagrass powder is dispersed for 20-40 minutes (min), preferably 21-39 min, preferably 22-38 min, preferably 24-36 min, preferably 26-34 min, preferably 27-33 min, preferably 28-32 min and preferably 29-31 min prior to heating to form a mixture. In some embodiments, the mixture is hydrothermally treated for 10-14 h, preferably 10.50-13.50 h, preferably 11.0-13.0 h, and preferably 11.50-12.50 h at 150-250° C., preferably 155-245° C., preferably 157-240° C., preferably 160-220° C., preferably 162-200° C., preferably 165-195° C., preferably 170-190° C., preferably 175-185° C. and preferably 180-182° C. In a preferred embodiment, the mixture is dispersed for 30 minutes and is hydrothermally treated in a Teflon-lined stainless steel autoclave in an oven for 12 h at 180° C. to form a suspension.

At step 56, the method 50 includes centrifuging the suspension to obtain a supernatant. In some embodiments, coarse filtration using filter paper, glass microfiber, or Büchner vacuum filtration helps eliminate larger seagrass residues and insoluble particles. This is usually followed by syringe filtration through membrane filters of decreasing pore sizes (0.45 μm, 0.22 μm, or even 0.1 μm). In a preferred embodiment, initially visible particles from suspension are removed via filtration followed by centrifugation to remove bigger particles.

In some embodiments, the centrifugation is performed under at least 12,000 rpm, and in other embodiments, the suspension is centrifuged at 10000-13000 rpm, preferably 10500-12500 rpm, preferably 10600-12400 rpm, preferably 10800-12200 rpm, and preferably 11000-12000 rpm. In a preferred embodiment, the suspension is centrifuged at 12000 rpm to obtain supernatant, and the resultant supernatant is kept at 4° C. for further use.

At step 58, the method 50 includes filtering the supernatant through a filter membrane and a dialysis membrane to form a CQDs solution including a plurality of CQDs. In some embodiments, size-exclusion chromatography is used to separate CQDs based on size, whereas sterile filtration through 0.22 μm filters may be applied if the product is intended for biological studies. In some embodiments, the filter membrane has a filtration size of 0.1-0.2 μm, preferably 0.12-0.18 μm, preferably 0.14-0.16 μm, preferably 0.15-0.16 μm, preferably 0.20-0.30 μm, preferably 0.21-0.29 μm and preferably 0.22-0.28 μm In a preferred embodiment, the filter membrane has a filtration size of 0.22 μm. In some embodiments, the dialysis membrane with molecular weight cut-off (MWCO) of preferably 1 kDa, preferably 2 kDa, preferably 3.5 kDa, preferably 5 kDa, or preferably 10 kDa can be used for filtration of CQDs. In some embodiments, the size of CQDs determined by transmission electron microscopy (TEM) in a range of 2-10 nm, preferably 2.5 to 9.5 nm, preferably 3.0 to 9.0 nm, preferably 3.5 to 8.5 nm, and preferably 4.0 to 8.0 nm.

According to an aspect of the present disclosure, the light absorption property of the CQDs is described. The CQDs have a light absorption spectrum including a first peak, a second peak, and a third peak. In some embodiments, the first peak of the spectra is at 200-250 nm, preferably 205-245 nm, preferably 210-240 nm, preferably 215-230 nm, preferably 216-225 nm, preferably 217-224 nm, preferably 218-223 nm, preferably 219-222 nm, and preferably 220-221 nm. In a preferred embodiment, the first peak of the absorption spectrum appears at 220.5 nm.

In other embodiments, the second peak is at 250-300 nm, preferably 255-295 nm, preferably 260-290 nm, preferably 265-285 nm, preferably 270-282 nm, preferably 271-280 nm, preferably 272-279 nm, preferably 273-278 nm, preferably 274-277 nm and preferably 275-277 nm, and the third peak is at 300-350 nm, preferably 302-345 nm, 303-340 nm, 304-335 nm, 305-330 nm, 306-320 nm, 307-318 nm, 308-315 nm and 309-312 nm. In a preferred embodiment, the second peak and third peak of the absorption spectrum appear at 276.5 nm and 310.5 nm, respectively.

In some embodiments, the optical band gap can be determined from absorption spectra using various methods, including the Tauc's plot method, derivative spectroscopy method, absorption edge (onset) method, Planck-Einstein relation, and the Kubelka-Munk function approach. In a preferred embodiment, the Tauc's method is used to determine the optical band gap of the CQDs, where the optical band gap energy of the CQDs ranges from 3-4 eV, preferably 3.1-3.9 eV, preferably 3.2-3.8 eV, preferably 3.3-3.7 eV, preferably 3.4-3.7 eV and preferably 3.5-3.7 eV. In a preferred embodiment, the band gap energy for the CQDs is 3.6 eV.

In some embodiments, the CQDs are in the form of spherical particles. In other embodiments, the CQDs can have various shapes depending on the synthesis method, including spherical, quasi-spherical, rod-like, polygonal, hollow, sheet-like, or irregular structures.

In some embodiments, the CQDs have a photoluminescence signal at 390-410 nm wavelength range, preferably 394-408 nm, preferably 395-407 nm, preferably 396-406 nm, preferably 397-405 nm, preferably 398-404 nm and preferably 400-402 nm, at an excitation wavelength of 350-450 nm, preferably 360-440 nm, preferably 370-430 nm, preferably 380-420 nm and preferably 390-410 nm. In a preferred embodiment, the excitation wavelength is 400 nm.

In some embodiments, the CQDs have a photoluminescence signal at 390-410 nm wavelength, preferably 392-408 nm, preferably 394-406 nm, preferably 396-404 nm, preferably 398-402 nm and preferably 400-401 nm, at an excitation wavelength of 350-450 nm, preferably 355-445 nm, preferably 360-440 nm, preferably 380-430 nm, preferably 390-420 nm and preferably 400-410 nm.

According to other aspects of the present disclosure, photoluminescence spectra of the CQD solutions corresponding to different excitation wavelengths are described. The CQDs have a Stokes shift of less than 83.0 nm at an excitation wavelength of 380 to 430 nm. In some embodiments, the CQDs have a stokes shift of 80 to 82 nm, preferably 80.5-81.5 nm and 81-82 nm at an excitation wavelength of 380-430 nm, preferably 385-425 nm, preferably 390-420 nm, preferably 395-415 nm, preferably 400-410 nm and preferably 305-410 nm, and an emission wavelength of 460-490 nm, preferably 465-485 nm, preferably 470-480 nm and preferably 475-480 nm. In a preferred embodiment, the CQDs has Stokes shift of 82 nm at an excitation wavelength of 380 nm and an emission wavelength of 462 nm, Stokes shift of 80 nm at an excitation wavelength of 390 nm and an emission wavelength of 470 nm, Stokes shift of 81 nm at an excitation wavelength of 400 nm and an emission wavelength of 481 nm and Stokes shift of 80 nm at an excitation wavelength of 410 nm and an emission wavelength of 490 nm.

In other embodiments, the CQDs have a Stokes shift of 80-83 nm, preferably 80.5-82.5 nm and preferably 81-82 nm at an excitation wavelength of 420-430 nm, preferably 422-429 nm, preferably 423-428 nm, preferably 424-427 nm and preferably 425-426 nm and an emission wavelength of 500-510 nm, preferably 502-509 nm, preferably 503-508 nm, preferably 504-507 nm and preferably 505-506 nm. In a preferred embodiment, the CQDs have the Stokes shift of 83 nm at an excitation wavelength of 420 nm and an emission wavelength of 503 nm and have the Stokes shift of 80 nm at an excitation wavelength of 430 nm and an emission wavelength of 510 nm.

The following examples are provided solely for illustration and are not to be construed as limitations of the present disclosure, as many variations thereof are possible without departing from the spirit and scope of the present disclosure.

Examples

The following examples demonstrate a method of synthesizing carbon quantum dots (CQDs). The examples are provided solely for illustration and are not to be construed as limitations of the present disclosure, as many variations thereof are possible without departing from the spirit and scope of the present disclosure.

Example 1: Synthesis of *Halodule uninervis* Seagrass-Derived CQDs

Figure 2A:
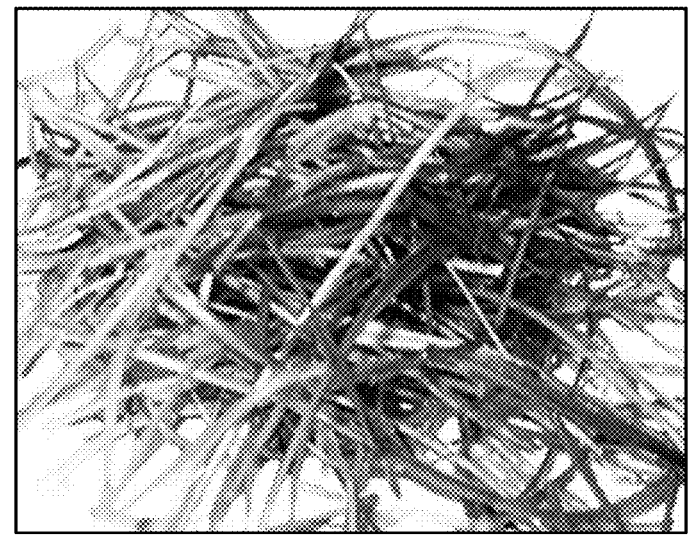
FIG. 2A shows an image of a *Halodule uninervis* seagrass, according to certain embodiments.
Figure 2A:
Figure 2B:
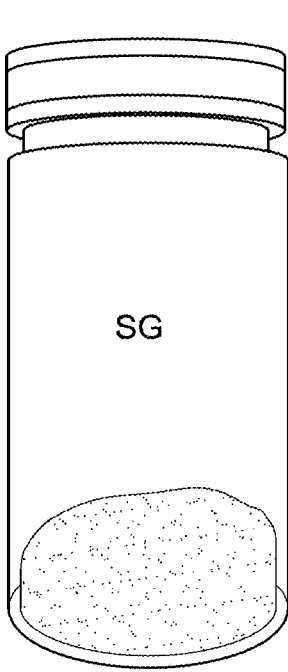
FIG. 2B shows an image of a dry seagrass power prepared from grinding the *Halodule uninervis* seagrass, according to certain embodiments.

To synthesize CQDs from *Halodule uninervis* seagrass (also referred to as seagrass) powder using green solvents, *Halodule uninervis* seagrass (FIG. 2A) was collected from a local seashore (Red Sea) and washed thoroughly to remove any impurities. Further, the sea grass was dried and ground into a fine powder (FIG. 2B), which was treated hydrothermally to form CQDs. During the hydrothermal treatment process, 1 gram (g) of seagrass powder was dispersed in 50 mL of deionized Millipore water for 30 minutes, and the dispersion was further transferred to a Teflon line stainless-steel autoclave reactor and kept in an oven at 180° C. for 12 hours (h). After that, the oven was switched off and the reactor was allowed to cool to room temperature, and the resultant was filtered to remove all visible solid particles, followed by centrifugation at 12000 rpm to remove bigger particles, if any. The obtained peal brown color solution was stored at 4° C. for further use. Before any characterization, it was filtered using a syringe filter of 0.22 micrometer (μm) pore size

Example 2: Characterization

The structural, morphological, and optical properties of the synthesized CQDs were investigated using various characterization techniques. The absorption property was studied using a JASCO UV-Vis-NIR spectrometer; Model: V-670, Japan. Photoluminescence (PL) spectra were obtained using FluoroLog-3 Spectrofluorometer, Horiba Scientific. Chemical composition was investigated using a NICOLET iS10 FTIR (Thermo Fisher Scientific, Waltham, Massachusells, USA) at room temperature over the wavenumber range of 400 cm$^{-1}$ to 4000 cm$^{-1}$. The high-resolution morphology and size of the CQDs were obtained using transmission electron microscopy (TEM) (JEOL; Model: JEM21 OOF, Japan).

Figure 3A:
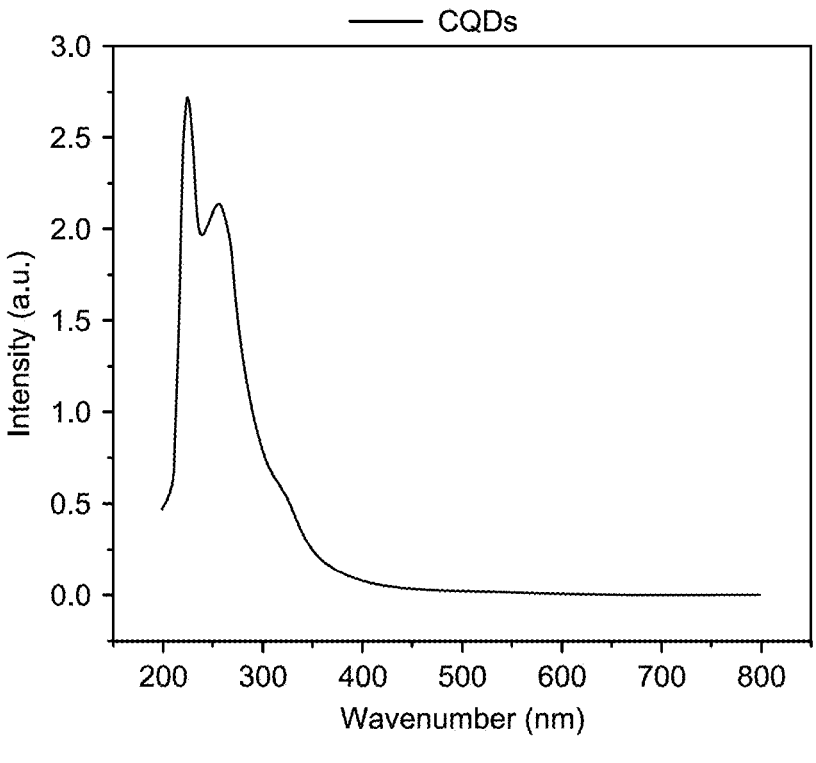
FIG. 3A shows a UV-visible absorption spectrum of the CQDs, according to certain embodiments.
Figure 3B:
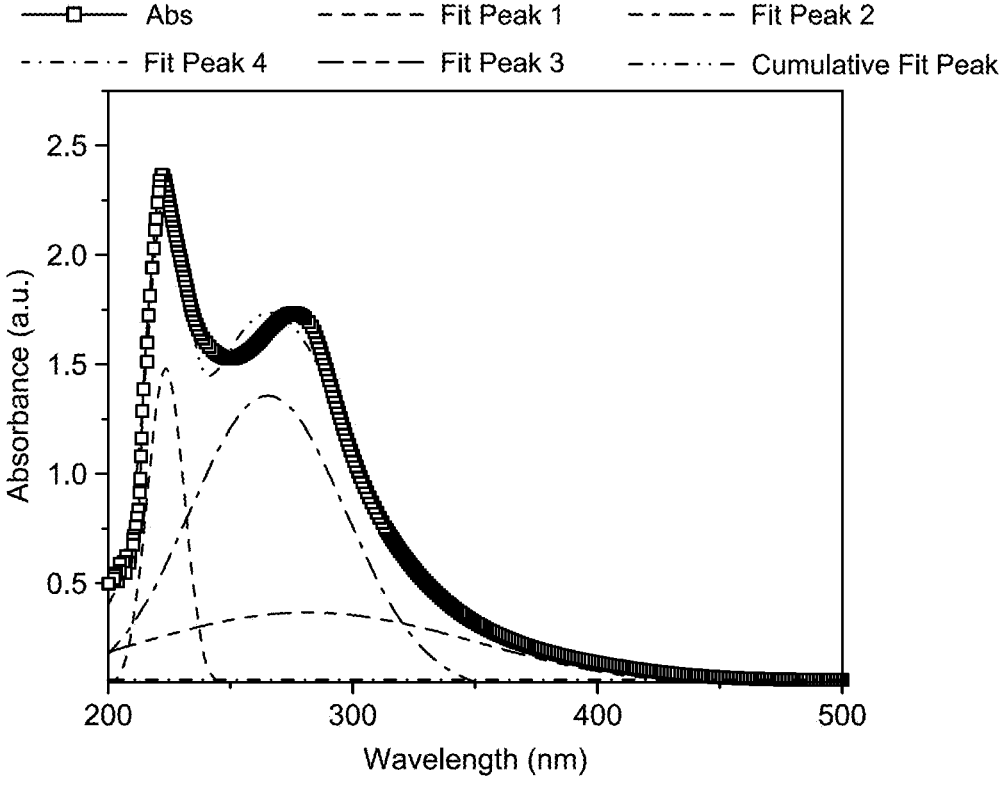
FIG. 3B shows a UV-vis absorption spectrum of the CQDs with fitted peaks, according to certain embodiments.
Figures 3C, 3D:
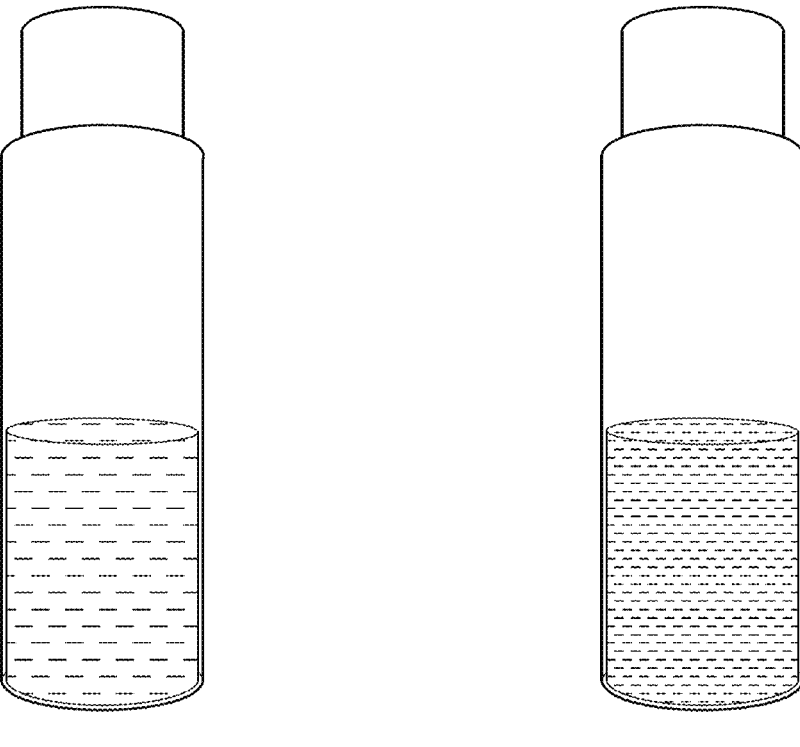
FIG. 3C shows an image of fluorescent emission of the CQD solutions stored in vials under visible light, according to certain embodiments.
FIG. 3D shows an image of fluorescent emission of the CQD solutions stored in vials under UV light having a wavelength of 395-400 nm, according to certain embodiments.
Figure 3E:
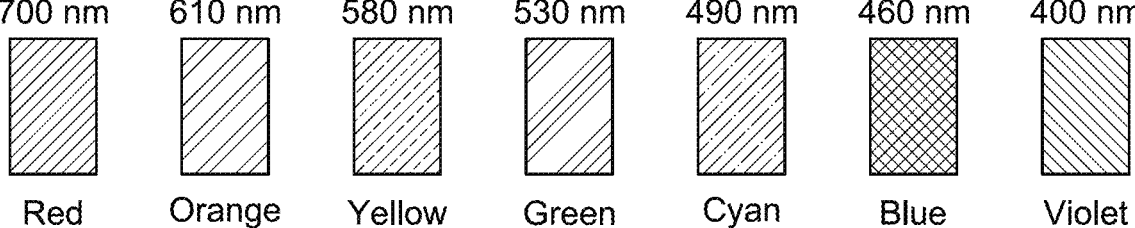
FIG. 3E shows a spectrum of the fluorescent emission containing wavelengths from 400 to 700 nm, according to certain embodiments.

FIG. 3A shows UV-Vis absorption spectra of the CQD prepared by the hydrothermal method. The absorption peak is further deconvoluted into 3 sub-peaks that are positioned at 220.5 nm (peak 1), 276.5 nm (peak 2), and 310.5 nm (peak 3) as shown in FIG. 3B. Also, FIG. 3C displays the blue fluorescence of the synthesized CQDs solution under UV light, whereas under visible light irradiation, the same solution exhibits no fluorescent emission.

Figure 4:
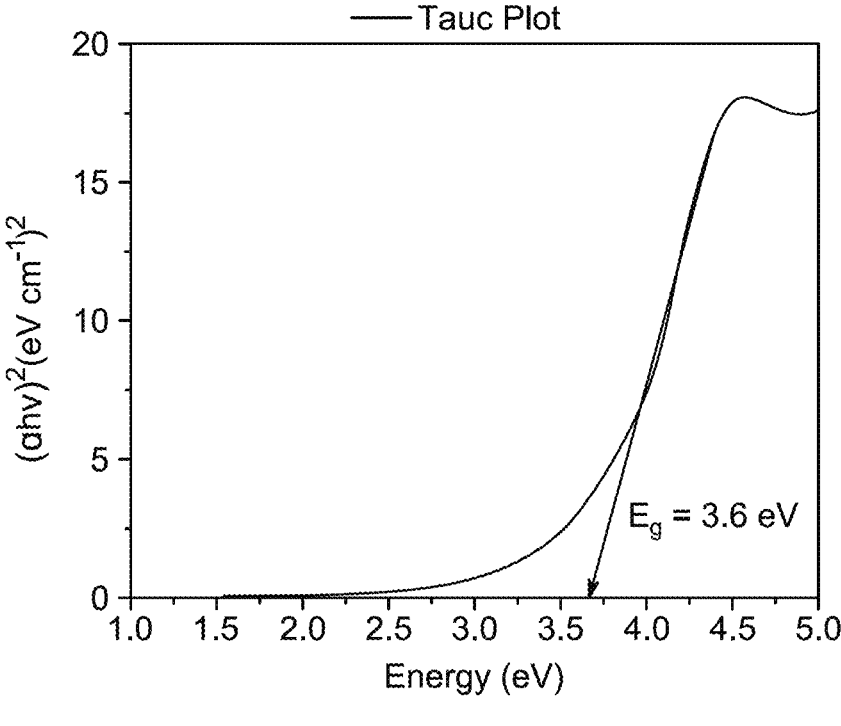
FIG. 4 shows a Tauc's plot to determine the band gap of the CQDs, according to certain embodiments.

The optical band gap of the synthesized CQDs was determined from the Tauc's plot, which relates the absorption coefficient to the photon energy. FIG. 4 shows the extrapolation of the linear region of the plot, provided the estimated band gap value and the obtained $E_g$ value for the CQD is calculated to be ~3.6 eV.

Figure 5:
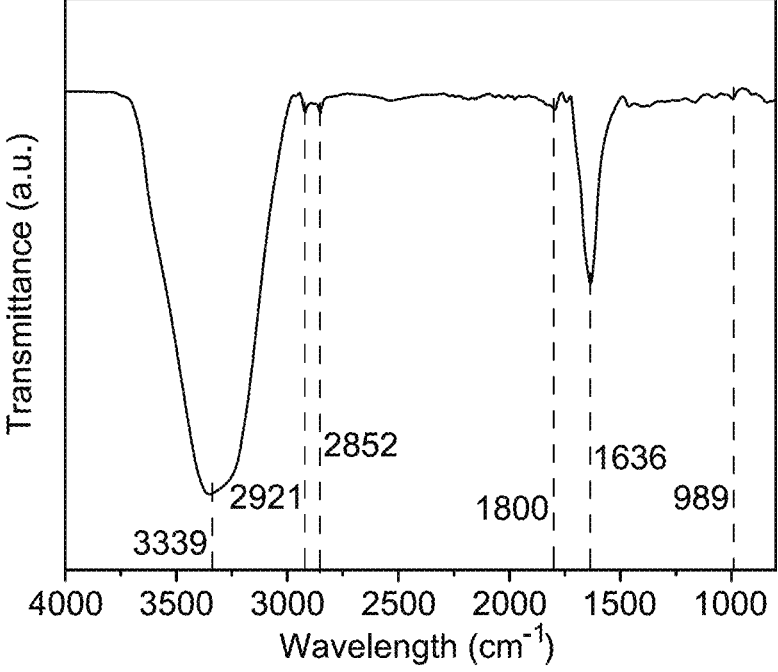
FIG. 5 shows a Fourier transform infrared spectrum of the CQDs, according to certain embodiments.

FIG. 5 shows the Fourier transform infrared (FTIR) spectra of the synthesized CQDs. FTIR spectra were acquired to do bonding analysis on the synthesized CQDs. The stretching vibration of O—H is linked to a massive absorption band at 3339 $cm^{-1}$, while the absorption peaks at 2852 $cm^{-1}$ and 2921 $cm^{-1}$ are linked to C—H stretch vibration. Peaks at 1636 $cm^{-1}$ and 989 $cm^{-1}$ are linked to C=O bonding. The absorption peaks at 1800 $cm^{-1}$ are associated with C—H bonding.

Figure 6A:
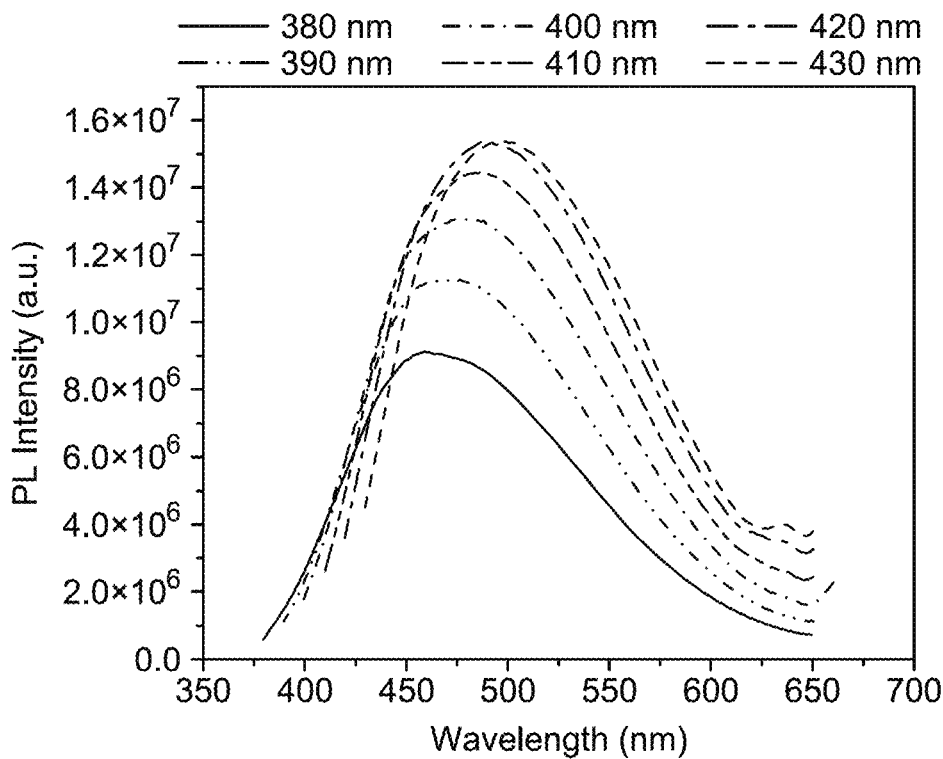
FIG. 6A shows a photoluminescence (PL) spectrum of the CQDs at an excitation wavelength of 380, 390, 400, 410, 420 and 430 nm, according to certain embodiments.
Figure 6B:
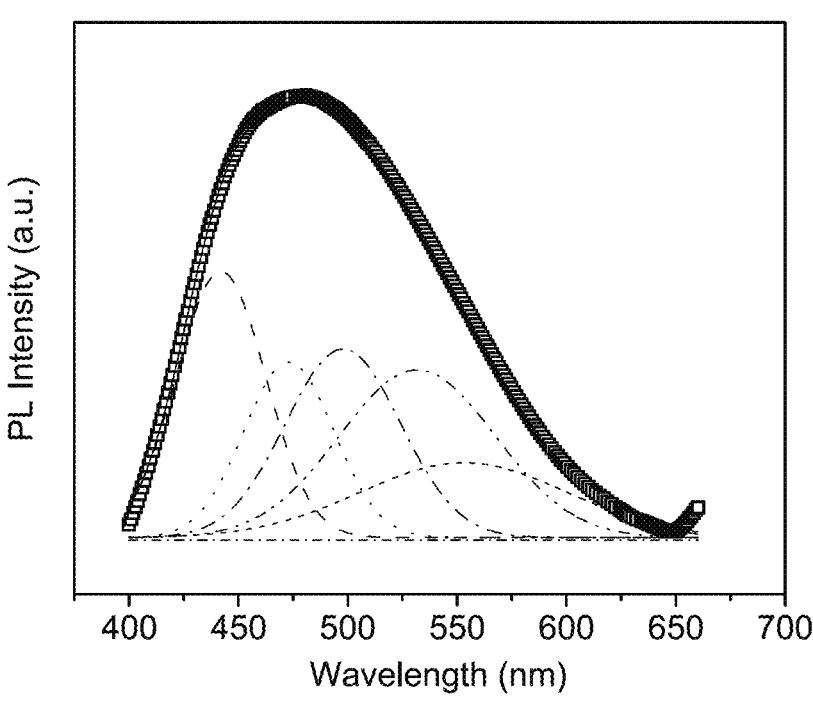
FIG. 6B shows a PL spectrum of the CQDs with the best fitted curve and the corresponding deconvoluted peaks, according to certain embodiments.
Figure 6C:
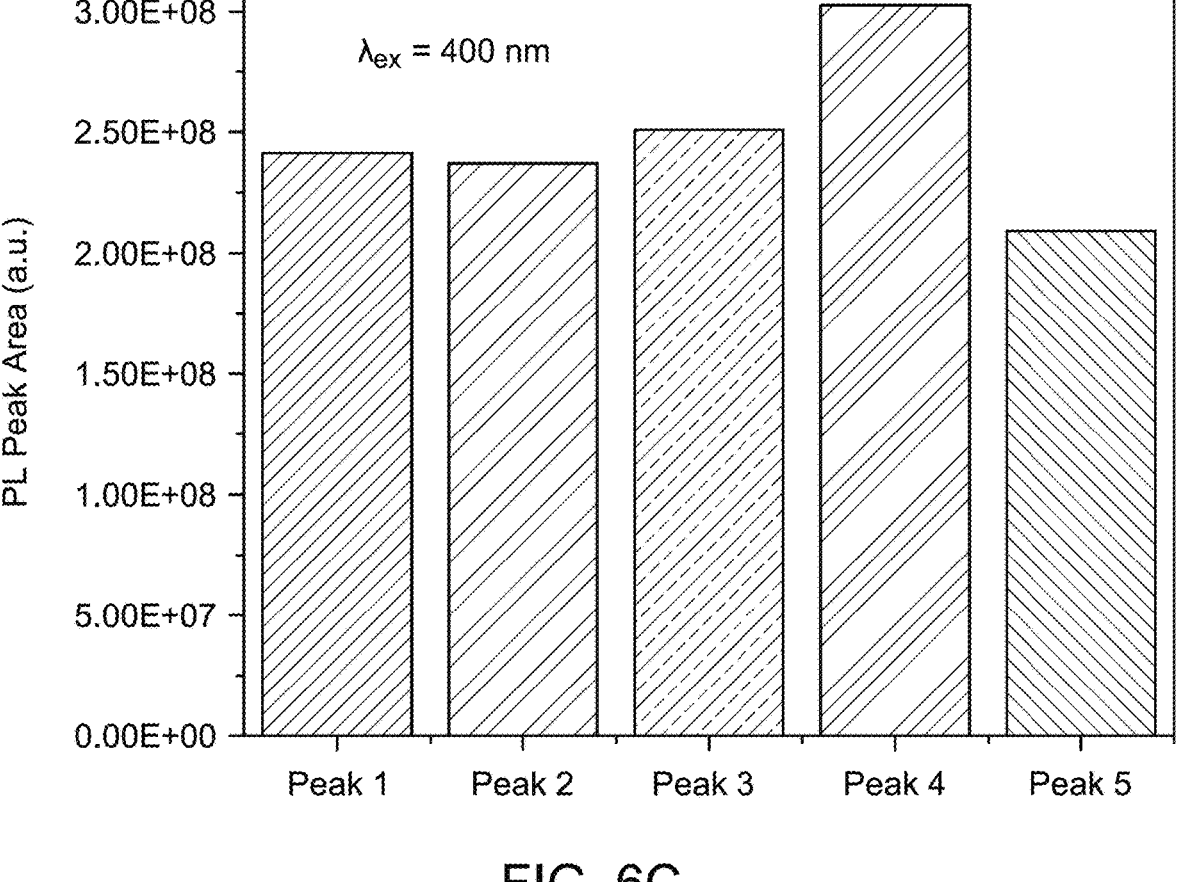
FIG. 6C shows a bar chart depicting integrated peak areas of the PL spectrum for Peak1 to Peak5 at an excitation wavelength of 400 nm, according to certain embodiments.

The excitation-dependent luminescence spectra of the CQDs are presented in FIGS. 6A-6B, excitation wavelength range from 380 to 430 nm. A wide emission spectrum was obtained between 380 nm and 650 nm. With the increase in the excitation wavelength from 380 to 430 nm, the most intense emission peaks shifted from 460 nm to 505 nm. This change in the peak position is mainly due to the presence of defects (surface defects) in the prepared CQDs. A steady shock shift of 83±3 nm was obtained. Table 1 shows the excitation wavelength, emission wavelength, and Stokes shift of the PL peaks. integrated peak areas of the photoluminescence spectrum for different peaks (Peak 1 to Peak 5) at an excitation wavelength ($\lambda$ex of 400 nm) are shown in FIG. 6C.

TABLE 1

| | Stokes shift observed for synthesized CQDs at different excitation wavelengths | | |
|---|---|---|---|
| Index | Excitation (nm) | Emission Peak (nm) | Stokes Shift (nm) |
| 1 | 380 | 462 | 82 |
| 2 | 390 | 470 | 80 |
| 3 | 400 | 481 | 81 |
| 4 | 410 | 490 | 80 |
| 5 | 420 | 503 | 83 |
| 6 | 430 | 510 | 80 |

Figure 7A:
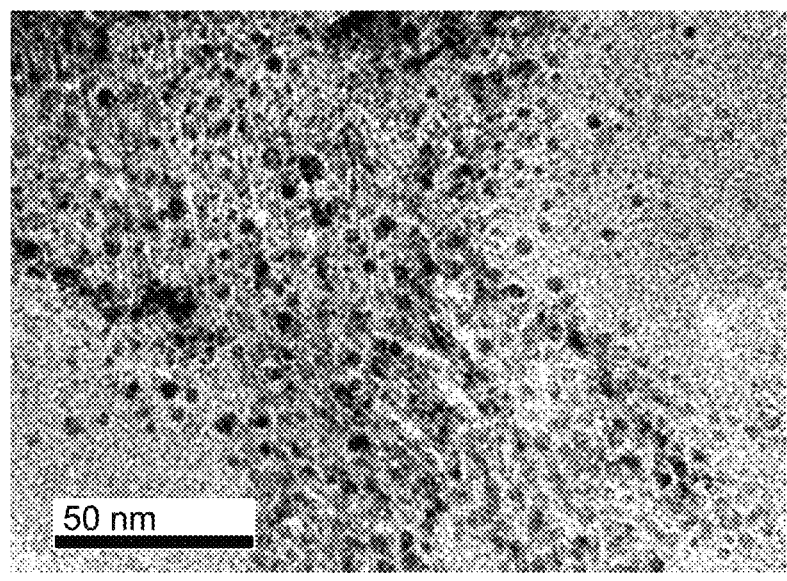
FIG. 7A shows a transmission electron microscopy (TEM) image of the CQDs at a scale of 50 nm, according to certain embodiments.
Figure 7B:
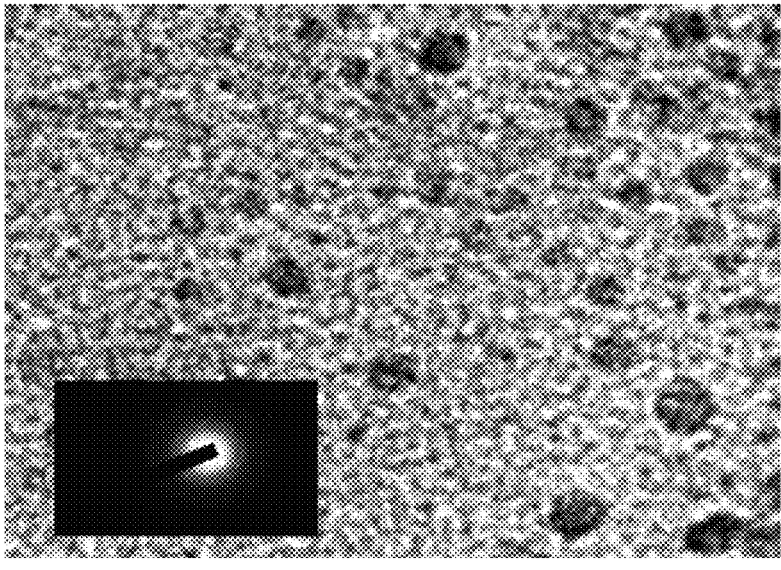
FIG. 7B shows a high-resolution TEM image and selected area electron diffraction (SAED) pattern of the CQDs, according to certain embodiments.

Transmission electron microscopy (TEM) image in FIGS. 7A-7B shows homogeneous size distribution of the synthesized CQDs having a size of 4 to 1 nm. Detraction image (inset) confirms good crystalline pattern of the synthesized CQDs.

Numerous modifications and variations of the present disclosure are possible in light of the above teachings. It is therefore to be understood that within the scope of the appended claims, the present disclosure may be practiced otherwise than as specifically described herein.

The invention claimed is:

1. A method of synthesizing carbon quantum dots (CQDs), comprising:

grinding a dry *Halodule uninervis* seagrass to form a seagrass powder;

heating a mixture comprising water and the seagrass powder to form a suspension;

centrifuging the suspension to obtain a supernatant;

filtering the supernatant through a filter membrane and a dialysis membrane to form a CQDs solution comprising a plurality of CQDs, wherein the carbon quantum dots have a Stokes shift of less than 83.0 nm at an excitation wavelength of 380 to 430 nm.

2. The method of claim 1, wherein the *Halodule uninervis* seagrass is obtained from the Red Sea and washed to remove water soluble impurities from the sea.

3. The method of claim 1, wherein the mixture comprises the seagrass powder at a percentage of 1 to 10 wt./vol. % based on a total weight of the seagrass powder and a total volume of water.

4. The method of claim 1, wherein the heating is performed in an autoclave at a temperature of 150 to 250 degrees Celsius (° C.).

5. The method of claim 1, wherein the centrifuging is performed under at least 12,000 rpm.

6. The method of claim 1, wherein the filtration membrane comprises a plurality of pores having an average size of 0.2 to 0.3 micrometers ($\mu$m).

7. The method of claim 1, wherein the CQDs have a photoluminescence signal at 390 to 410 nm wavelength range at an excitation wavelength of 350 to 450 nm.

8. The method of claim 1, wherein the CQDs have a light absorption comprising a first peak, a second peak, and a third peak.

9. The method of claim 8, wherein the first peak is at 200 to 250 nm.

10. The method of claim 8, wherein the second peak is at 250 to 300 nm.

11. The method of claim 8, wherein the third peak is at 300 to 350 nm.

12. The method of claim 1, wherein the CQDs have an optical band gap energy of 3 to 4 eV.

13. The method of claim 1, wherein the CQDs are in the form of spherical particles having a size of 4 to 11 nm.

14. The method of claim 1, wherein the CQDs have a Stokes shift of 80 to 82 nm at an excitation wavelength of 380 to 430 nm and an emission wavelength of 460 to 490 nm.

15. The method of claim 1, wherein the CQDs have a Stokes shift of 80 to 83 nm at an excitation wavelength of 420 to 430 nm and an emission wavelength of 500 to 510 nm.

* * * * *